US010416522B2

(12) United States Patent
Podbelski et al.

(10) Patent No.: US 10,416,522 B2
(45) Date of Patent: Sep. 17, 2019

(54) APPARATUS INCLUDING A CONTROL DEVICE AND A METHOD OF USING THE SAME

(71) Applicant: SAGE ELECTROCHROMICS, INC., Faribault, MN (US)

(72) Inventors: Louis J. Podbelski, Eagan, MN (US); Joshua M. Battles, Faribault, MN (US); Bryan D. Greer, Northfield, MN (US); Helen E. Sanders, Faribault, MN (US)

(73) Assignee: SAGE ELECTROCHROMICS, INC., Faribault, MN (US)

( * ) Notice: Subject to any disclaimer, the term of this patent is extended or adjusted under 35 U.S.C. 154(b) by 0 days.

(21) Appl. No.: 15/879,069

(22) Filed: Jan. 24, 2018

(65) Prior Publication Data
US 2018/0231860 A1    Aug. 16, 2018

Related U.S. Application Data

(60) Provisional application No. 62/450,368, filed on Jan. 25, 2017.

(51) Int. Cl.
*G02F 1/163* (2006.01)
*B32B 17/10* (2006.01)
(Continued)

(52) U.S. Cl.
CPC ........ *G02F 1/163* (2013.01); *B32B 17/10513* (2013.01); *B60J 3/04* (2013.01);
(Continued)

(58) Field of Classification Search
CPC .......... G02F 1/163; G02F 1/155; G02F 1/153; E06B 2009/2464; E06B 9/24
(Continued)

(56) References Cited

U.S. PATENT DOCUMENTS

2007/0133078 A1    6/2007   Fanton et al.
2013/0222877 A1    8/2013   Greer et al.
(Continued)

FOREIGN PATENT DOCUMENTS

WO    2018140495 A1    8/2018

OTHER PUBLICATIONS

International Search Report and Written Opinion for PCT/US2018/015049, dated May 10, 2018, 17 pages.

*Primary Examiner* — Mohammed A Hasan
(74) *Attorney, Agent, or Firm* — Abel Schillinger, LLP; Robert N. Young

(57) ABSTRACT

An apparatus can include a control device configured to select a scene from a collection of scenes for a window including electrochromic devices in response to receiving an input corresponding to state information. In another aspect, a method of operating an apparatus can include receiving an input corresponding to state information; and at a control device, in response to receiving the input, selecting a scene from a collection of scenes. The collection of scenes may be validated before using the scenes. The scenes may be validated based on physical configuration of the controlled space, preferences of the occupant, or the like. Still further, scenes can be changed to allow for the passage of time or an illusion of changing sky conditions when sky conditions are not changing. The apparatus and method can be simpler to understand and implement as compared to complex control strategies.

20 Claims, 6 Drawing Sheets

(51) Int. Cl.
*G02F 1/155* (2006.01)
*G02F 1/1523* (2019.01)
*B60J 3/04* (2006.01)
*E06B 9/24* (2006.01)

(52) U.S. Cl.
CPC ............... *E06B 9/24* (2013.01); *G02F 1/155* (2013.01); *G02F 1/1523* (2013.01); *B32B 2255/20* (2013.01); *E06B 2009/2405* (2013.01); *E06B 2009/2464* (2013.01); *G02F 2001/1555* (2013.01)

(58) Field of Classification Search
USPC .......................................................... 359/275
See application file for complete search history.

(56) References Cited

U.S. PATENT DOCUMENTS

| | | |
|---|---|---|
| 2013/0271812 A1* | 10/2013 | Brown ....................... E06B 9/24 359/275 |
| 2014/0177028 A1 | 6/2014 | Shrivastava et al. |
| 2014/0236323 A1 | 8/2014 | Brown et al. |
| 2014/0268287 A1 | 9/2014 | Brown et al. |
| 2014/0300945 A1 | 10/2014 | Parker |
| 2014/0303788 A1 | 10/2014 | Sanders et al. |
| 2015/0092259 A1 | 4/2015 | Greer et al. |
| 2015/0116811 A1 | 4/2015 | Shrivastava et al. |
| 2016/0054633 A1* | 2/2016 | Brown .................... G02F 1/163 359/275 |
| 2016/0070151 A1 | 3/2016 | Shrivastava et al. |
| 2016/0259225 A1 | 9/2016 | Paolini, Jr. et al. |
| 2016/0306249 A1 | 10/2016 | Egerton et al. |

* cited by examiner

APPARATUS INCLUDING A CONTROL DEVICE AND A METHOD OF USING THE SAME

CROSS-REFERENCE TO RELATED APPLICATION

The present application claims priority under 35 U.S.C. § 119(e) to U.S. Provisional Patent Application No. 62/450,368, filed Jan. 25, 2017, entitled "Apparatus Including a Control Device and a Method of Using the Same," naming as inventors Louis J. Podbelski et al., which application is assigned to the current assignee hereof and is incorporated by reference herein in its entirety.

BACKGROUND

Field of the Disclosure

The present disclosure is directed to apparatuses, and more specifically to apparatuses used in controlling operations of infrastructure within a building or vehicle and methods of operating the same.

Related Art

Windows with electrochromic devices are being used as part of environmental controls for a building. Other environmental controls, such as heating, ventilation, and air conditioning, lights, and potentially other facilities may be controlled along with the electrochromic devices. Very complicated and highly integrated systems are used for the environmental controls. The level of complexity and integration are causing such systems to be quite difficult to change or even maintain by facilities personnel, as such personnel may not be experts in computer programming or may not know or understand the logic that the architect or building used in designing the environmental controls. Thus, frustration, many lost man hours, or hiring a computer expert may be needed to affect even a small change in the environmental controls. A need exists for a better control strategy that can be implemented by facilities personnel, or even the occupant that may not be a programmer or familiar with the building's facilities.

BRIEF DESCRIPTION OF THE DRAWINGS

Embodiments are illustrated by way of example and are not limited in the accompanying figures.

Figure 1:
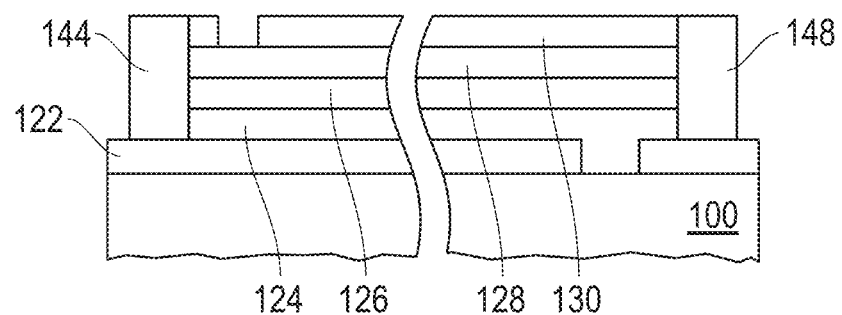
FIG. 1 includes an illustration of a cross-sectional view of a portion of a substrate, a stack of layers for an electrochromic device, and bus bars.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

The use of the word "about", "approximately", or "substantially" is intended to mean that a value of a parameter is close to a stated value or position. However, minor differences may prevent the values or positions from being exactly as stated. Thus, differences of up to ten percent (10%) for the value are reasonable differences from the ideal goal of exactly as described.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the infrastructure controls for a building or vehicle and within the electrochromic arts.

A control device can be configured to select a scene from a collection of scenes for a window including switchable devices in response to receiving an input corresponding to state information. The window may include architectural glass used for a skylight or a wall of a building or may include a moon roof or a side window of a vehicle. The control device can be part of an apparatus that includes the window and switchable devices. In an embodiment, the control device can include a remote portion outside a controlled space and a local portion within the control space. The remote portion may be located or coupled to other building environmental controls, and the local portion may supply proper voltages to the switchable devices to achieve the desired scene.

The methods of adding and deleting scenes to a collection of scenes can be relatively simple and performed by an occupant of the controlled space, if needed or desired. In an embodiment, scenes may be validated to allow for better control of scenes. Further, complex and difficult to control logic may be replaced with simpler and more intuitive control of scenes for a window. The apparatus and method are better understood after reading this specification in conjunction with the accompanying figures.

The apparatuses and methods can be implemented with switchable devices that affect the transmission of light through a window. Much of the description below addresses embodiments in which the switchable devices are electrochromic devices. In other embodiments, the switchable devices can include suspended particle devices, liquid crystal devices that can include dichroic dye technology, and the like. Thus, the concepts as described herein can be extended to a variety of switchable devices used with windows.

FIG. 1 includes a cross-sectional view of a portion of a window including a substrate 100, a stack of layers 122, 124, 126, 128, and 130, and bus bars 144 and 148 overlying the substrate 100. The substrate 100 can be transparent and include a glass substrate, a sapphire substrate, an aluminum oxynitride substrate, a spinel substrate, or a transparent polymer. In a particular embodiment, the substrate 100 can be float glass or a borosilicate glass and have a thickness in a range of 0.5 mm to 4 mm thick. In another particular embodiment, the substrate 100 can include ultra-thin glass that is a mineral glass having a thickness in a range of 50 microns to 300 microns.

The stack of layers includes transparent conductive layers 122 and 130 that are coupled to the bus bars 144 and 148, respectively. The transparent conductive layers 122 and 130 can include a conductive metal oxide or a conductive polymer. Examples can include a tin oxide or a zinc oxide, either of which can doped with a trivalent element, such as Al, Ga, In, or the like, or a sulfonated polymer, such as polyaniline, polypyrrole, poly(3,4-ethylenedioxythiophene), or the like. The transparent conductive layers 122 and 130 can have the same or different compositions.

The layers 124 and 128 are electrode layers, wherein one of the layers is an electrochromic (EC) layer and the other of the layers is an ion storage layer (sometimes called a counter electrode layer). The EC layer can include an inorganic metal oxide electrochemically active material, such as $WO_3$, $V_2O_5$, $MoO_3$, $Nb_2O_5$, $TiO_2$, $CuO$, $Ir_2O_3$, $Cr_2O_3$, $Co_2O_3$, $Mn_2O_3$, or any combination thereof and have a thickness in a range of 50 nm to 2000 nm. The ion storage layer can include any of the materials listed with respect to the electrochromic layer and may further include nickel oxide (NiO, $Ni_2O_3$, or combination of the two), and Li, Na, H, or another ion and have a thickness in a range of 80 nm to 500 nm.

An ion conductive layer 126 (sometimes called an electrolyte layer) is optional, is between the electrode layers 124 and 128, and has a thickness in a range of 20 microns to 60 microns. The ion conductive layer 126 allows ions to migrate therethrough and does not allow a significant amount of electrons to pass therethrough. The ion conductive layer 126 can include a silicate with or without lithium, aluminum, zirconium, phosphorus, boron; a borate with or without lithium; a tantalum oxide with or without lithium; a lanthanide-based material with or without lithium; another lithium-based ceramic material; or the like.

After reading this specification, skilled artisans will appreciate that other compositions and thicknesses for the layers 122, 124, 126, 128, and 130 can be used without departing from the scope of the concepts described herein.

Each of the transparent conductive layers 122 and 130 include portions removed, so that the bus bars 144 and 148 are not electrically connected to each other. Such removed portions are typically 20 nm to 2000 nm wide. In a particular embodiment, the bus bar 144 is electrically connected to the electrode layer 124 via the transparent conductive layer 122, and the bus bar 148 is electrically connected to the electrode layer 128 via the transparent conductive layer 130. The bus bars 144 and 148 include a conductive material. In an embodiment, each of the bus bars 144 and 148 can be formed using a conductive ink, such as a silver frit, that is printed over the transparent conductive layer 122. In another embodiment, one or both of the bus bars 144 and 148 can include a metal-filled polymer, such as a silver-filled epoxy. In a particular embodiment (not illustrated), the bus bar 148 can include the conductive-filled polymer that is disposed over the transparent conductive layer 130 and spaced apart from the layers 122, 124, 126, and 128. The viscosity of the precursor for the metal-filled polymer may be sufficiently high enough to keep the precursor from flowing through cracks or other microscopic defects in the underlying layers that might be otherwise problematic for the conductive ink.

Figure 2:
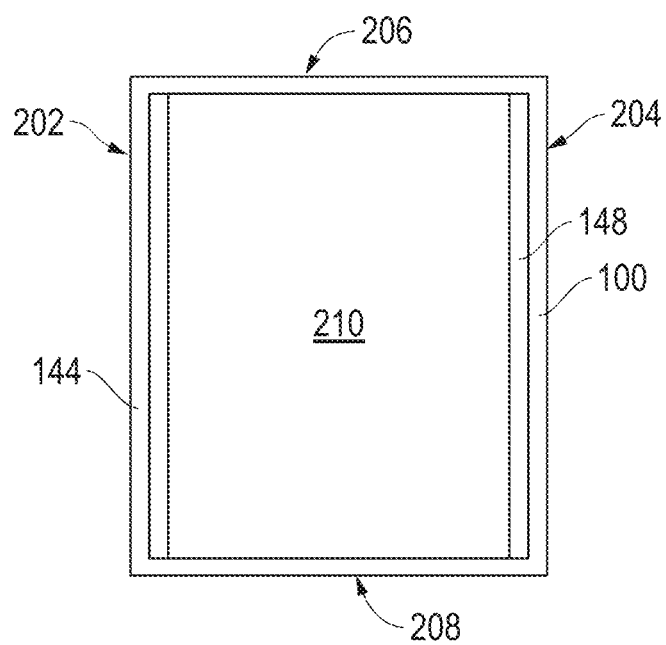
FIG. 2 includes an illustration of a top view of the substrate, the stack of layers, and the bus bars.

FIG. 2 includes a top view of the substrate 100 and an EC device 210 that includes the layers as described with respect to FIG. 1. The bus bar 144 lies along a side 202 of the substrate 100, and the bus bar 148 lies along a side 204 that is opposite the side 202. Each of the bus bars 144 and 148 have lengths that extend a majority of the distance between a side 206 and a side 208 that is opposite the side 206. The lengths of the bus bars 144 and 148 are substantially parallel to each other. As used herein, substantially parallel is intended to means that the lengths of the bus bars 144 and 148 are within 10 degrees of being parallel to each other.

Figure 3:
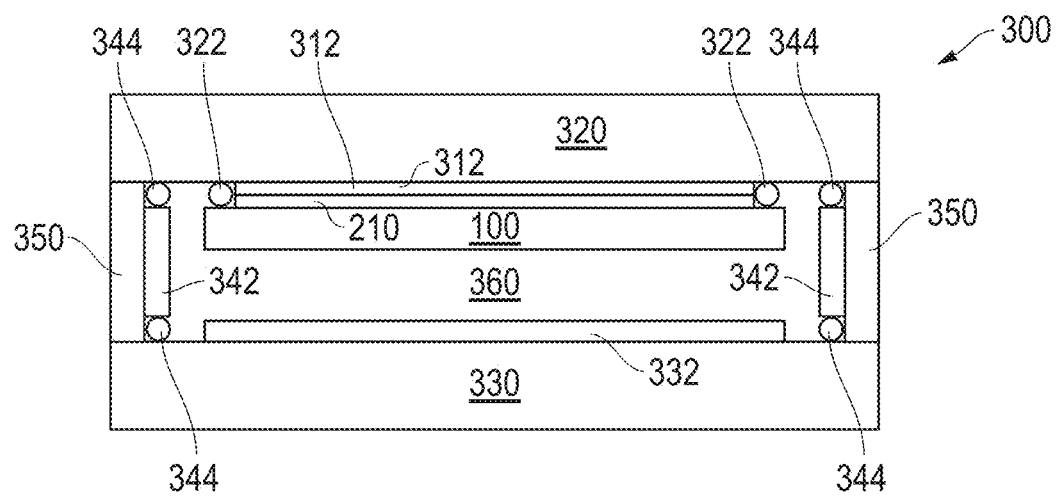
FIG. 3 includes an illustration of a cross-sectional view of an insulating glass unit that includes the substrate and an electrochromic device.

In an embodiment, the window can include an insulated glass unit (IGU). The IGU may be used along a wall of a building or may be used in a skylight. In another application, the window can be used in a vehicle window, such as part of a moon roof, a side passenger window, or the like. Thus, the examples are merely illustrative and do not limit the scope of the present invention as defined in the appended claims FIG. 3 includes an illustration of a cross-sectional of an IGU 300 that includes the substrate 100 and the EC device 210 as illustrated in FIGS. 1 and 2. In FIG. 3, the bus bars are not illustrated to simplify understanding of the structure of the IGU 300. The IGU 300 further includes a counter substrate 320 and a solar control film 312 disposed between the EC device 210 and the counter substrate 320. A seal 322 is disposed between the substrate 100 and the countersubstrate 320 and around the EC device 210. The seal 322 can include a polymer, such as polyisobutylene. The counter substrate 320 is coupled to a pane 330. Each of the counter substrate 320 and pane 330 can be a toughened or a tempered glass and have a thickness in a range of 2 mm to 9 mm. A low-emissivity layer 332 can be disposed along an inner surface of the pane 330. The counter substrate 320 and pane 330 can be spaced apart by a spacer bar 342 that surrounds the substrate 100 and EC device 210. The spacer bar 342 is coupled to the counter substrate 320 and pane 330 via seals 342. The seals 342 can be a polymer, such as polyisobutylene. The seals 342 can have the same or different composition as compared to the seal 322. An adhesive joint 350 is designed to hold the counter-substrate 320 and the pane 330 together and is provided along the entire circumference of the edges of the counter-substrate 320 and the pane 320. An internal space 360 of the IGU 300 may include a relatively inert gas, such as a noble gas or dry air. In another embodiment, the internal space 360 may be evacuated.

Figure 4:
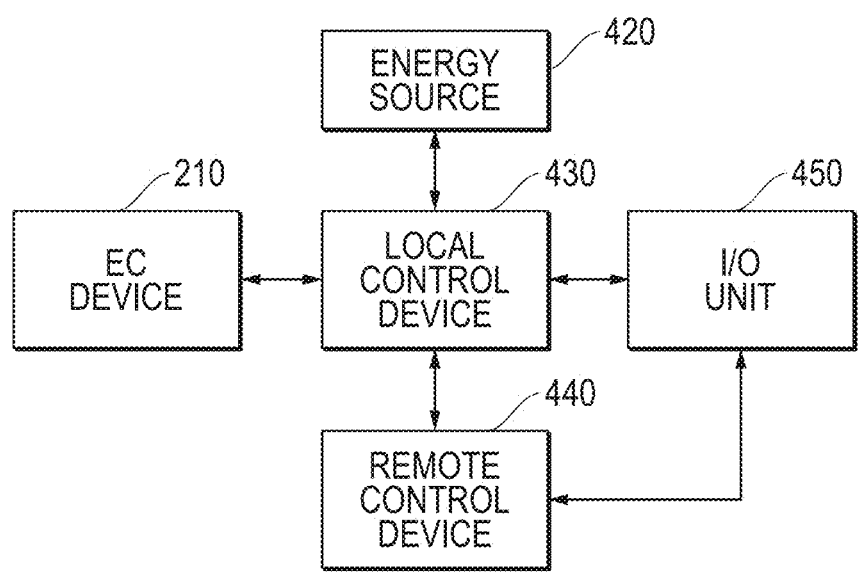
FIG. 4 includes a schematic diagram of an apparatus that includes the electrochromic device, an energy source, control devices, and an input/output unit.

FIG. 4 includes a simplified schematic diagram of an apparatus 400 that includes the EC device 210, an energy source 420, a local control device 430, a remote control device 440, and an input/output (I/O) unit 450. The energy source 420 provides energy to the EC device 210 via the local control device 430. In an embodiment, the energy source 420 may include a photovoltaic cell, a battery, another suitable energy source, or any combination thereof.

The local control device 430 can be coupled to the EC device 210, the energy source 420, the remote control device 440, and the I/O unit 450. The local control device 430 can include logic to control the operation of the EC device 210 and will be described in more detail later in this specification. In an embodiment, the remote control device 440 can include logic to control the operation of building environmental and facility controls, such as heating, ventilation, and air conditioning (HVAC), lights, scenes for EC devices, including the EC device 210, and will be described in more detail later in this specification. In an embodiment, the local control device 430 may be within a controlled space having the EC device, and the remote control device 450 may be outside the controlled space having the EC device. The controlled spaced may be a room, such as a meeting room or an office, or may be part of a floor of a building, wherein a window of the EC device can affects light, glare, or temperature of the controlled space. The logic for the either or both of control devices 430 and 440 can be in the form of hardware, software, or firmware. In an embodiment, the logic may be stored in a field programmable gate array (FPGA), an application-specific integrated circuit (ASIC), a hard drive, a solid state drive, or another persistent memory. In an embodiment, the control devices 430 and 450 may include a processor that can execute instructions stored in memory within the control devices 430 and 450 or received from an external source.

More or fewer control devices may be used. In an embodiment, all of the functions that will be described with respect to the remote control device 440 may incorporated into the local control device 430. In another embodiment, more than one local control device may be used. For example, a local control device may be adjacent to an IGU, and another local control device may be within the controlled space and spaced apart from the IGU. Such other local control device may be near light switches, a thermostat, or a door for the controlled space. Logic operations are described below with respect to particular control devices with respect to an embodiment. In another embodiment, a logic operation described with respect to a particular control device may be performed by another control device or be split between the control devices. After reading this specification, skilled artisans will be able to determine a particular configuration that meets the needs or desires for a particular application.

The I/O unit 450 can be coupled to the control devices 430 and 450 or just one of the control devices. The I/O unit 450 can provide to a control device signals corresponding to state information that can include a light intensity, an occupancy of a controlled space corresponding to the window, a physical configuration of the controlled space, a temperature, an operating mode of a heating or cooling system, a sun position, a time of day, a calendar day, an elapsed time since a scene has been changed, heat load within the controlled space, a contrast level between relatively bright and relatively dark objects within a field of view where an occupant is normally situated within the controlled space, whether an orb of the sun is in the field of view where the occupant is normally situated within the controlled space, whether a reflection of the sun is in the field of view where the occupant is normally situated within the controlled space, a level of cloudiness, or another suitable parameter, or any combination thereof. In another embodiment, the I/O unit 450 can include a monitor and keyboard for a human to interact with the apparatus 400.

With respect to the EC device 210, the location of the other components in the apparatus 400 may be adjacent to or spaced apart from the EC device 210. In an embodiment, the IGU 300 in FIG. 3 may include the EC device 210 and the energy source 420. In another embodiment, the energy source 420, the local control device 430, the I/O unit 450 may be located in or attached to a frame that holds the IGU 300. In a further embodiment, the local control device 430, the remote control device 450, the I/O unit 450, or any combination thereof may be located over a meter from the IGU 300 and frame. After reading this specification, skilled artisans will be able to determine particular location of components of the apparatus 400 for a particular application.

The apparatus 400 can be used to allow for scene-based control of EC device within a window, such as an IGU installed as part of architectural glass along a wall of a building or a skylight, or within a vehicle. As the number of EC devices for a controlled space increases, the complexity in controlling the EC devices can also increase. Even further complexity can occur when the control of the EC devices is integrated with other building environmental controls. In an embodiment, the window can be skylight that may include over 900 EC devices. Coordinating control of such a large number of EC devices with other environmental controls can lead to very complicated control scenes, which some facilities personnel without extensive computer programming and experience with complex control systems may find very challenging.

The inventors have discovered that using scene-based control of a window can provide a less complicated control methodology can be implemented that is easier for facilities personnel and occupants to understand. A scene can be a discrete transmission pattern of the EC devices for the window. A scene may be selected from a collection of scenes, and the EC devices can be controlled to achieve the scene. The scenes may be validated, so that they are use at appropriate times and under appropriate conditions. The scenes may be correlated to state information, so that a validated scene for the window is used.

A scene generated for a controlled space may have been suitable for an original physical configuration of the controlled space; however, the scene may no longer be acceptable after the physical configuration has changed. For example, the original physical configuration for controlled space may have been a portion of a floor including cubicles room. Remodeling may be performed and additional walls may be installed. The physical configuration of the controlled space may have changed in size and become different controlled spaces, one of which can be a conference room. Glare may be more problematic with the conference room, as compared to the controlled space with cubicles. Thus, a previously validated scene may no longer be acceptable.

Figure 5:
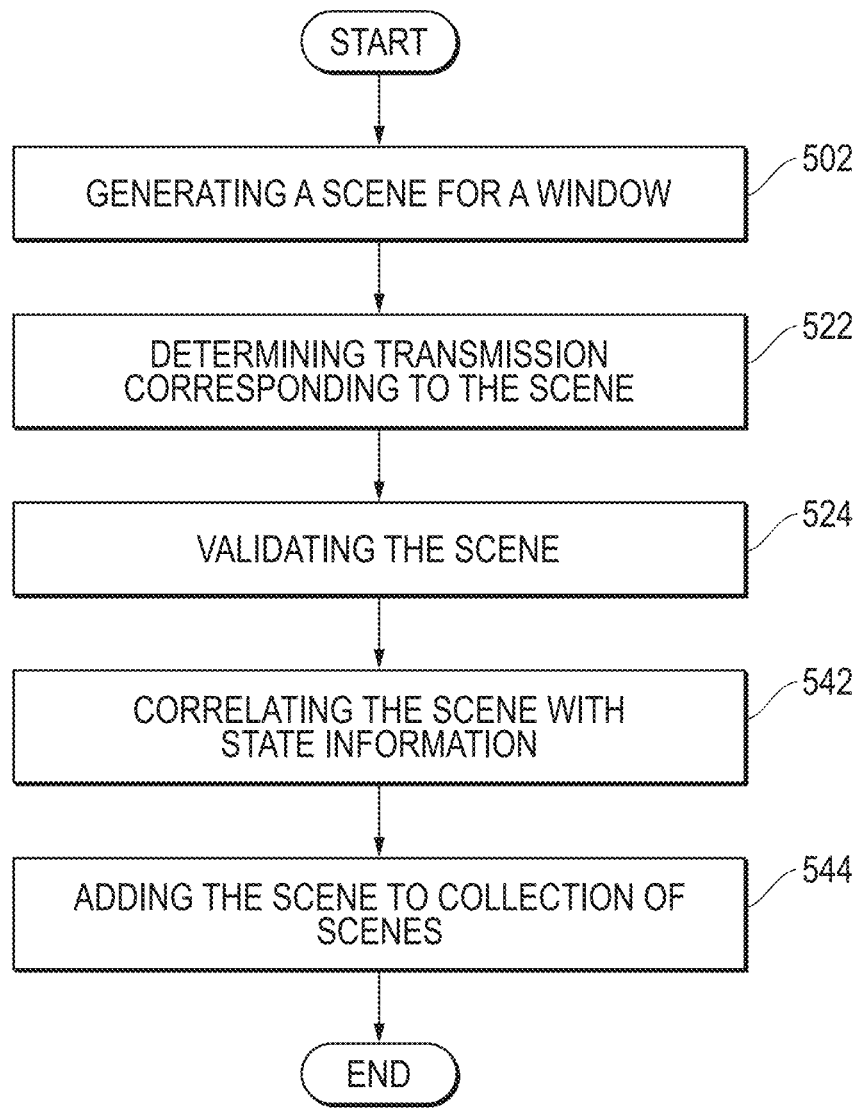
FIG. 5 includes a process flow when adding a scene to a collection of scenes.

When using scene-based control of a window for a controlled spaced, scenes can be part of a collection, and the scene can be selected based on state information received by control devices. Before using the scenes, the collection of scenes can be generated. FIG. 5 includes a method of generating a collection of scenes. The method can include generating a scene for a window, at block 502. A few exemplary scenes can include all EC devices for a window being at the highest transmission state (fully tinted), all EC devices for the window being at the lowest transmission state (bleached), and different rows of EC devices for the window being at other transmission states. The method can further include determining transmission corresponding to the scene, at block 522. The transmission information may be for each EC device within a scene, so that the scene may be recreated at a later time.

The method can further include validating the scene, at block 524. The validation may depend on the physical configuration of the controlled space, personal preferences, or the like. The window may include three rows of EC devices. For a controlled space with cubicles, the scene illustrated in FIG. 6 may be acceptable, as more light may be needed along a top row to pass over cubicle walls. For a controlled space that is a conference room, a scene, such as the right-most scene in FIG. 7, may be unacceptable due to too much light entering, particularly later in the morning. However, another scene, such as the right-most scene in FIG. 8, may be acceptable for a conference room, particularly if the bottom row of EC devices is at or below the level of a table top. The validation may be performed when the building is originally built and configured, and such scenes are referred to herein as original scenes. At a time after generating the original scenes, an occupant or facilities personnel may save a scene that the he or she particularly likes or generates. Such a scene is referred to as a learned scene. For example, after a physical configuration of the controlled space is changed, new scenes may be generated that are more appropriate for the new physical configuration. The local control device 430 can include a button that allows the occupant or another human to provide input to the apparatus 400 via the I/O unit 450 to store the scene. Similarly, a prior scene, whether original or learned, may no longer be acceptable in view of the change in physical configuration. The local control device 430 may include another button that allows that allows the occupant or another human to provide input to the apparatus 400 via the I/O unit 450 to delete or invalidate the scene. Still further, the local control device 430 may allow the occupant to adjust individual EC devices or subsets of EC devices and save the particular scene created. Yet further, when the occupant changes, the learned scenes may be deleted, and the original scenes restored.

The method can further include correlating the scene with state information, at block 542. The state information may be provided along with scenes when the building is constructed or when the window is installed. For a learned scene, the state information at the time the scene is stored may be captured and stored with the learned scene. The method can include adding the scene to the collection of scenes, at block 544. On a subsequent day, the control device 430 or 440 may later select an original or learned scene from the collection of scenes when such scene's corresponding state information matches or is close to state information at the time when the control device 430 or 440 is being used to select a scene.

After reading this specification, skilled artisans will understand that the order of actions in FIG. 5 may be changed. Furthermore, one or more actions may not be performed, and one or more further actions may be performed in generating the collection of scenes.

Figure 6:
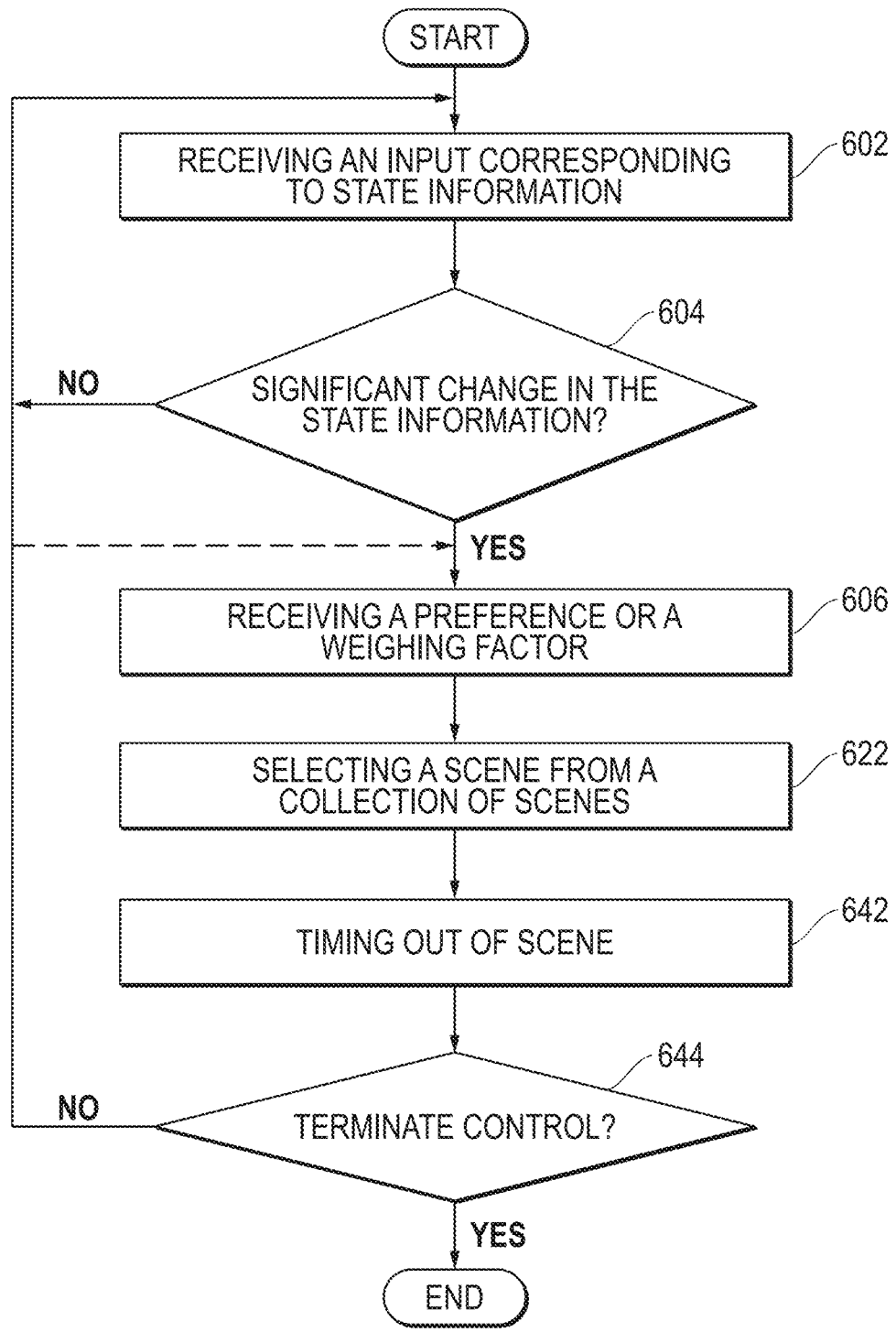
FIG. 6 includes a process flow when operating an apparatus to control scenes at a window.

After the collection of scenes is generated, a scene from the collection can be selected, and a control device can control the EC devices of the window to achieve scene for the window. FIG. 6 includes an exemplary, non-limiting method of operating an apparatus to achieve a scene corresponding to state information. The method includes receiving input corresponding to state information, at block 602. Different types of state information have been previously described. The state information may be collected at the I/O unit 450 from sources of state information, such as sensors, a calendar, a clock, a weather forecast, or the like. The collection of state information may occur nearly continuously, such as from a motion sensor, light sensor, or the like, on a periodic basis, such as once a minute, every ten minutes, hourly, or the like, or a combination thereof.

A decision may be performed to determine whether there is a significant change in the state information, at diamond 604. For example, a minute may have passed since state information has been collected, yet, other than the passage of time, nothing of significance may have occurred. During that time, nobody may have entered or left the controlled space, the position of the sun has only insignificantly changed position, the sky may have substantially the same level of clouds between the sun and the controlled space, or the like. In such a situation, the method can proceed on the No branch, and further input corresponding to state information may continued to be received. Alternatively, a significant change may have occurred. For example, a person may have entered the controlled space that was previously unoccupied, a change in sky conditions may have occurred (e.g., a sunny sky may now be cloudy), the sun may no longer be in a position where it directly shines on the window, or the like. When the change is significant, the method can proceed on the "Yes" branch. Thus, the scene for the window may be changed.

The method can further include receiving a preference or a weighing factor, at block 606. A control device, such as the local control device 430 or the remote control device 440, may review the collection of scenes and generate a subset of scenes that correspond to the state information. Some scenes in that subset may be favored over others in that subset. For example, one of scenes may be a learned scene that is liked by the occupant of the controlled space over other scenes within the subset. Learned scenes may be assigned a higher preference or weighing factor compared to scenes that were generated the time the building was built or before the size and layout for the current physical configuration of the controlled space was made. In another embodiment, a preference or weighing factor may be used for a particular scene that has not been used recently. For example, many scenes may have been used more recently that the particular scene. A higher preference or weighing factor may be used for the particular scene as compared to other scenes, so that the scenes may be rotated and reduce using the same scenes too frequently. The preference or weighing factor is optional and not required in all embodiments.

The method can include selecting a scene from the collection of scenes, at block 622. In the embodiment previously described, a subset of scenes may have been identified and preferences or weighing factors considered. A logic element, such as a processor, an FPGA, an ASIC, or the like within the control device can make the selection. Upon selection of the scene, the control device can adjust voltages for the EC devices to achieve the scene. In a particular embodiment, the remote control device 440 may perform the selection and send signals to the local control device 430, which in turn can set the voltages for the EC devices.

In an embodiment, the scenes may be occasionally changed, even if there is no significant change in the state information. For example, the controlled space may be occupied, the window may be a skylight, and during a time span from 11:30 am to 12:30 pm there is no significant change in the sunlight. Even though there is no significant change in state information, the scene may be changed to provide a more visible perception that the day is progressing. For example, the scene may be changed at least once for predetermined amount of time, such as 5 minutes, 10 minutes, 20 minutes, or the like. The control device can select a new scene from the subset of scenes and change the voltages of the EC devices to achieve the new scene.

At a later time, the control of the EC devices may be terminated. Thus, a decision can be made whether to terminate control, at diamond 644. For example, each day after sunset, the EC devices may be changed to the highest transmission state and no longer controlled until just before sunrise the next day. In this particular embodiment, the control can be terminated, corresponding to the "Yes" branch. Otherwise, the method proceeds along the "No" branch. The method may continue back to just before receiving state information, at block 602 (illustrated with a solid line), just before receiving the preference or the weighing factors, at block 606 (illustrated with a dashed line), or another position in the flow chart as illustrated in FIG. 6.

Other methods for operating the apparatus may be used. For example, the control logic may allow a significant change in state information to interrupt the method at nearly any point in the method to allow a change in scenes, even if the current scene has not timed out. The actions previously described for the method may be performed in a different order. Still further, some of the actions may be optional. For example, preferences or weighing factors do not have to be used, and a time-out feature for scenes may not be used. After reading this specification, skilled artisans will be able to determine a methodology that is well suited for a particular application.

The scene-based selection may be better understood with particular examples that are described with respect to FIGS. 7 to 12. In the examples described, the EC devices will be in one of three states to simplify understanding of the concepts as described herein. The states include a high transmission state, a low transmission state, and an intermediate transmission state that is between the two transmission states. The high transmission state may be at the highest level of transmission (fully bleach); however it can be at another transmission level that is higher than both of the intermediate and low transmission states. The low transmission state may be at the lowest level of transmission (fully tinted); however it can be at another transmission level that is lower than both of the intermediate and high transmission states. In actual practice, a continuum of transmission states can be used. After reading this specification, skilled artisans will be able to determine transmission states that will be used with the scenes.

Figure 7:
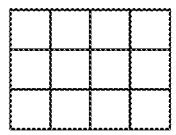
FIG. 7 includes scenes for a window as sunlight reaching the window increases.
Figure 7:
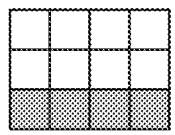
Figure 7:
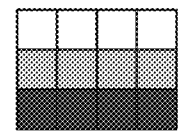
Figure 7:
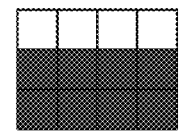

FIG. 7 includes an illustration of a window that includes many IGUs each having an EC device. In an embodiment, the window may face east and may receive full sunlight at sunrise. The four illustrations represent different scenes that can be used as time between just before sunrise to a couple of hour past sunrise. The left-most scene may be used an hour before sunrise. The EC devices are in the high transmission state. At twilight, the left-center scene may be used, where the bottom row of EC devices may be in an intermediate transmission state to reduce some of the brightness. Just after sunrise, the right-center scene may be used, where the bottom row of EC devices can be in a low transmission state, and the middle row can be in an intermediate transmission state. A little later, the sun has cleared trees, and the full intensity of sunlight may be received by the window. Referring to the right-most scene, the lower two rows can be in the low transmission state, and the top row remains in the high transmission state. In this particular embodiment, the top row allows more natural light to enter to maintain a level of color balance within the controlled space. If all rows would be in the low transmission state, the controlled space would have too much blue light. Thus, in this particular embodiment, a scene with all EC devices in the low transmission state may be unacceptable when sunlight is reaching the window. Therefore, a preference or weighing factor may allow scenes with at least one EC device to be in an intermediate or high transmission state, even though control logic, without preferences or weighing factors, may allow all EC devices to be in the low transmission state. In another embodiment, the level of blue light may not be as much of a concern, and having all EC devices in the low transmission state may be acceptable, and therefore, valid. The validation process allows particular scenes to pass criteria and be added to the collection of scenes for particular sets of state information, such as at twilight to a time a couple of hours past sunrise.

Figure 8:
FIG. 8 includes other scenes for a window as sunlight reaching the window increases.
Figure 8:
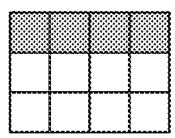
Figure 8:
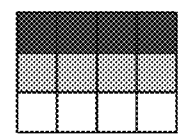
Figure 8:
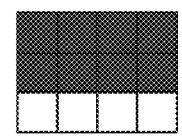

FIG. 8 includes an illustration of a window that includes many IGUs each having an EC device. In an embodiment, the window may face south or southeast. Sunlight at and shortly after sunrise may not be problematic. However, later in the morning, the sun will be higher in the sky, and sunlight entering the upper part of the window may be more problematic. The four illustrations represent different scenes that can be used as time between a few of hours past sunrise to a time a little after Noon, such as 12:30 pm, 1:00 pm or the like. The left-most scene may correspond to an hour after sunrise. The EC devices are in the high transmission state. By 9 am, significant sunlight may be entering the window. Unlike the embodiment corresponding to FIG. 7, the sun is higher in the sky. The top row of EC devices may be in an intermediate transmission state to reduce some of the brightness, as illustrated in the left-center scene of FIG. 8. By 10 am, the top row of EC devices can be in a low transmission state, and the middle row can be in an intermediate transmission state, as illustrated in the right-center scene. By 11 am, the sun is to the south of the building, and the full intensity of sunlight may be received by the window. The upper two rows can be in the low transmission state, and the bottom row remains in the high transmission state. In this particular embodiment, the bottom row allows more natural light to enter to maintain a level of color balance within the controlled space. Thus, the validation process as previously described may be similar to the one as described with respect to the embodiment illustrated in FIG. 7, yet provide a different set of scenes due to the orientation of the window (e.g., facing south as opposed to east).

In another embodiment, FIGS. 7 and 8 may represent the same window facing east; however, the physical configuration within the controlled space may be changed. The scenes illustrated in FIGS. 7 and 8 may represent the same time span. FIG. 7 may be used when the physical configuration corresponds to cubicles. The top row may be allowed to stay at the high transmission state, so that ambient light may pass over cubicle walls. The controlled space may have a change in physical configuration, so that the physical configuration corresponds to a conference room. The cubical walls are no longer present. However, glare from the sun and off a conference room table may be problematic. After the change in configuration, the scenes in FIG. 7 may no longer be valid, and the scenes in FIG. 8 may be valid. Thus, the bottom row of EC device may remain in the high transmission state to allow for color balance in the controlled space when it is a conference room.

Figure 9:
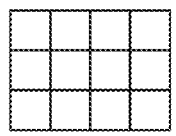
FIG. 9 includes further scenes for a window as sunlight reaching the window increases.
Figure 9:
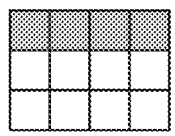
Figure 9:
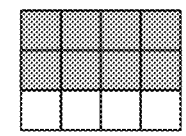
Figure 9:
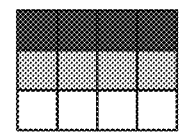

FIG. 9 illustrates scenes for another window in accordance with another embodiment. For example, the window may face west and trees or a structure may be within the view of and cast a shadow the window during particular times of the day. In the particular embodiment, the trees or other structures may allow different scenes to be used. In a particular embodiment, the left-most scene for the window may correspond to a time before Noon. By 2 pm, the top row of EC devices is in the intermediate transmission state, as illustrated by the left-center scene. By 3 pm, the amount of sunlight reaching the window increases, and the upper two rows are in the intermediate transmission state, as illustrated in the right-center scene. By 4 pm, the sunlight reaching the west-facing window is very high; however, the trees or structure may block some of the sunlight. Thus, the top row is in the low transmission state, the middle row is in the intermediate transmission state, and the bottom row is in the high transmission state, as illustrated by the right-most scene.

The validation process is useful, as it can take into account a change in physical configuration, such as changing from cubicles to a conference room, or changing conditions outside the window, such as over a period of 10 years when trees are now large enough to block some sunlight or a neighboring structure may have been recently built.

Figure 10:
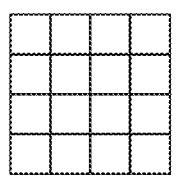
FIGS. 10 and 11 includes scenes for a window throughout a day.
Figure 10:
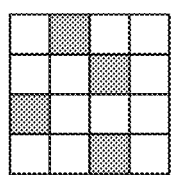
Figure 10:
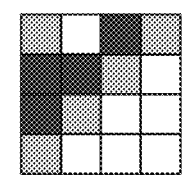
Figure 10:
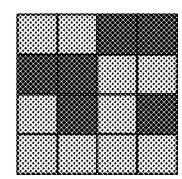
Figure 11:
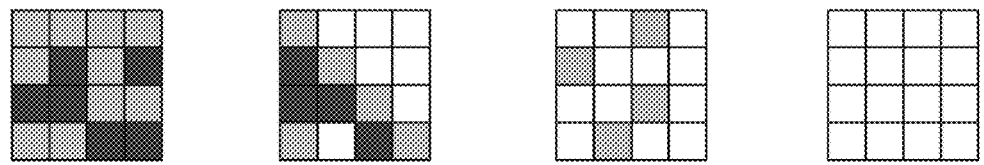

FIGS. 10 and 11 include illustrations of scenes that may be used. In this particular embodiment, the window is a skylight. In FIG. 10, as the sun rises, the transmission of sunlight is decreased. Before sunrise, all EC devices are in the high transmission state, as illustrated in the left-most scene. As the sun is higher in the sky, some of the EC devices may be in an intermediate transmission state, as illustrated in the left-center scene.

By mid-morning, substantial sunlight may be reaching the window. Some of the EC devices are in the high transmission state, other EC devices are in the intermediate transmission state, and still other EC devices are in a low transmission state. In this particular embodiment, the left-center EC device along the top row, which is in the high transmission state, is immediately adjacent to an EC device that is in the high transmission state, and another EC device in the intermediate transmission state. In particular, when comparing the first three EC devices along the top row, the left-center EC device has a high transmission state as compared to the left-most EC device, which has the intermediate transmission state, and the right-center EC device, which has the low transmission state of the three EC devices. Conventionally, an EC device at the high transmission state is adjacent to an EC device that is in either the low transmission state or the intermediate transmission state, but not adjacent to both an EC device that is in the low transmission state and another EC device that is in the intermediate transmission state. Such a configuration may help with color balance and to make the skylight appear more striking in appearance. At a time close to Noon, all EC devices may be in intermediate and low transmission states, as illustrated in the right-most scene in FIG. 10.

FIG. 11 includes illustrations corresponding to times later in the day for the same window as described with respect to FIG. 10. In FIG. 11, the timeframe continues from around Noon to sunset, as sunlight reaching the window decreases. The left-most scene includes a scene that is used about the same as the right-most scene in FIG. 10. Thus, even though the state information may not have significantly changed, the scene can be changed to provide a perception of time passing to an occupant, as compared to not changing the scene.

By mid-afternoon, substantial sunlight may be reaching the window but will be at a lower angle as compared to a time closer to Noon. In the left-center scene in FIG. 11, some of the EC devices are in the high transmission state, other EC devices are in the intermediate transmission state, and still other EC devices are in a low transmission state. When comparing the left-center scene of FIG. 11 and the right-center scene of FIG. 10, the number of EC devices in the high transmission state between the two scenes is the same, the number of EC devices in the intermediate transmission state between the two scenes is the same, the number of EC devices in the low transmission state between the two scenes is the same. In another embodiment, the number of EC devices in any particular transmission states for the two scenes may be different. Thus, even through the scenes may be similar, the right-center scene of FIG. 11 may be validated for use in the afternoon but not in the morning, and the left-center scene of FIG. 10 may be validated for use in the morning but not in the afternoon. Such validation may be based at least in part on the position of the sun with respect to the window.

Still later in the afternoon, less sunlight may be reaching the window, and the right-center scene of FIG. 11 may be used. After sunset, all EC devices can be in the low transmission state, as illustrated in the right-most scene.

In another embodiment, pairs of scenes in FIGS. 10 and 11 may be used for the same time of day. In this particular embodiment, the control device may alternate between scenes in accordance with Table 1 below.

TABLE 1

Correlation Between Scenes in FIGs. 10 and 11

| Time of Day | Scene in FIG. 10 | Scene in FIG. 11 | Comments |
| --- | --- | --- | --- |
| Before sunrise | Left-most | Right-most | Same scene |
| Early morning after sunrise | Left-center | Right-center | May alternate between the two scenes |
| Mid-morning | Right-center | Left-center | May alternate between the two scenes |
| Around Noon | Right-most | Left-most | May alternate between the two scenes |

TABLE 1-continued

Correlation Between Scenes in FIGs. 10 and 11

| Time of Day | Scene in FIG. 10 | Scene in FIG. 11 | Comments |
| --- | --- | --- | --- |
| Mid-afternoon | Right-center | Left-center | May alternate between the two scenes |
| Late afternoon just before sunset | Left-center | Right-center | May alternate between the two scenes |
| After sunset | Left-most | Right-most | Same scene |

Alternating the scenes may help to provide the occupants with a better sense of time passing. Furthermore, some alternating scenes may provide the appearance of changing conditions outdoors, even when the conditions are not significantly changing. For example, the right-center scene in FIG. 10 and left-center scene in FIG. 11 may be alternated during the morning or in the afternoon. For example, during the morning, the right-center scene of FIG. 10 may help to reduce glare more than the left-center scene of FIG. 11, even though the left-center scene in FIG. 11 is not optimal for reducing glare. Still, the right-center scene of FIG. 10 and the left-center scene of FIG. 11 can be validated for use as alternating scenes. By alternating between the two scenes, an occupant may have the impressing that high clouds are passing between the sun and the window when the right-center scene of FIG. 10 is active, and the impression that the high clouds are not present when the left-center scene of FIG. 11 is active. Thus, even if no clouds are present outdoors throughout the time period described, the occupant may have the impression that high clouds passed, even when no high clouds are actually present.

Figure 12:
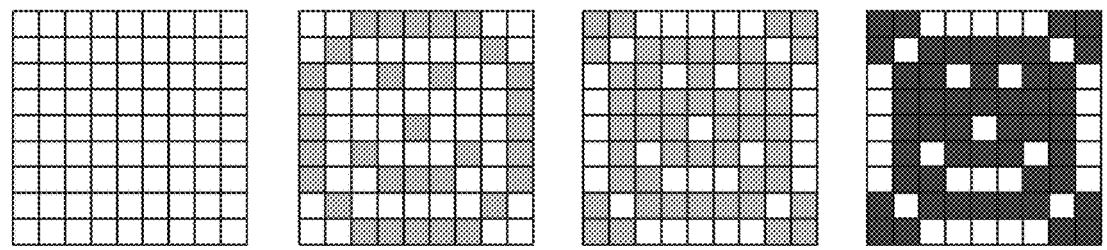
FIG. 12 includes scenes that form an image for a window as sunlight reaching the window increases.

In another embodiment, the scenes may be based on a set of images. FIG. 12 includes scenes as the amount of sunlight reaching a window increases. The EC devices for the left-most scene are all in a high transmission state. As sunlight increases, a smiley face starts to appear as many of the EC devices are in an intermediate transmission state, as depicted in the left-center scene. Later in the morning, a complementary image of the scene, as depicted in the right-center scene, may be used. Near Noon, the right-most scene may be used.

Many examples of scenes and their use have been illustrated and described. Such scenes for the windows are not limited to the examples illustrated or described. Other scenes can be validated and used without departing from the concepts described herein.

Embodiments allow for simpler and more understandable control of EC devices for a window. Complex control systems are not required to be implemented. Scenes can be validated and added to a collection. The scenes may be generated when the building having the controlled space is being desired or first built. Learned scenes can be added with ease. Still further, the scenes can be changed with changing conditions, such as a new build being erected near the window, over passage of time as a tree grows, a change in the physical configuration of the controlled space, preferences of the current occupant, or the like. Scenes can be changed so that the passage of time may be more perceptible or to give an illusion of sky conditions outside, where such sky conditions are not significantly changing.

Many different aspects and embodiments are possible. Some of those aspects and embodiments are described below. After reading this specification, skilled artisans will appreciate that those aspects and embodiments are only illustrative and do not limit the scope of the present invention. Exemplary embodiments may be in accordance with any one or more of the ones as listed below.

Embodiment 1

An apparatus can include a control device configured to select a first scene from a collection of scenes for a window including switchable devices in response to receiving a first input corresponding to state information.

Embodiment 2

The apparatus of Embodiment 1, further including the window including the switchable devices coupled to the control device, wherein the switchable devices affect transmission of light through the window.

Embodiment 3

The apparatus of Embodiment 1 or 2, wherein the control device includes a remote portion that is located remotely to a controlled space associated with the window and a local portion that is located within the controlled space.

Embodiment 4

A method of operating an apparatus including receiving a first input corresponding to state information; and at a control device, in response to receiving the first input, selecting a first scene from a collection of scenes for a window including switchable devices.

Embodiment 5

The method of Embodiment 4, further including adding a first learned scene to the collection of scenes.

Embodiment 6

The method of Embodiment 5, further including deleting the first learned scene from the collection of scenes.

Embodiment 7

The method of Embodiment 6, further including changing a physical configuration within the controlled space.

Embodiment 8

The method of Embodiment 7, further including adding a second learned scene to the collection of scenes, wherein the second learned scene is different from the first learned scene.

Embodiment 9

The method of Embodiment 8, wherein adding the second learned scene is performed after changing the physical configuration within a controlled space and deleting the first learned scene.

Embodiment 10

The method of any one of Embodiments 4 to 9, further including validating the first scene before selecting the first scene.

Embodiment 11

The apparatus or the method of any one of Embodiments 1 to 10, wherein the collection of scenes, including the first scene, includes a set of discrete transmission patterns for the window, wherein the discrete transmission patterns correspond to the scenes.

Embodiment 12

The apparatus or the method of Embodiment 11, wherein the collection include a first pre-programmed scene and a first learned scene, wherein the first scene is the first pre-programmed scene or the first learned scene.

Embodiment 13

The apparatus or the method of any one of Embodiments 1 to 12, wherein the state information includes a light intensity, an occupancy of a controlled space corresponding to the window, a physical configuration of the controlled space, a temperature, an operating mode of a heating or cooling system, a sun position, a time of day, a calendar day, an elapsed time since a scene has been changed, heat load within the controlled space, a contrast level between relatively bright and relatively dark objects within a field of view where an occupant is normally situated within the controlled space, whether an orb of the sun is in the field of view where the occupant is normally situated within the controlled space, whether a reflection of the sun is in the field of view where the occupant is normally situated within the controlled space, or a level of cloudiness.

Embodiment 14

The apparatus or the method of any one of Embodiments 1 to 13, wherein the window has a sufficient number of the switchable devices to provide an image or information.

Embodiment 15

The apparatus or the method of any one of Embodiments 1 to 14, wherein the switchable devices include electrochromic devices.

Embodiment 16

The apparatus or the method of any one of Embodiments 1 to 15, wherein: the electrochromic devices include a first electrochromic device having a first edge, a second electrochromic device having a second edge, and a third electrochromic device having a third edge and a fourth edge; the first edge of the first electrochromic device is immediately adjacent to the third edge of the third electrochromic device, and the second edge of the second electrochromic device is immediately adjacent to the fourth edge of the third electrochromic device; and for the first scene, where comparing transmission levels of the first, second, and third electrochromic devices, the first electrochromic device has a lowest transmission level, the second electrochromic device has an intermediate transmission level, and the third electrochromic device has a highest transmission level.

Note that not all of the activities described above in the general description or the examples are required, that a portion of a specific activity may not be required, and that one or more further activities may be performed in addition to those described. Still further, the order in which activities are listed is not necessarily the order in which they are performed.

Certain features that are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. An apparatus comprising:
a control device configured to select a first scene from a collection of scenes for a window in response to receiving a first input corresponding to state information, wherein the window includes switchable devices and wherein the switchable devices comprises a first electrochromic device, a second electrochromic device, and a third electrochromic device, and wherein the first electrochromic device has a lowest transmission level, the second electrochromic device has an intermediate transmission level, and the third electrochromic device has a highest transmission level.

2. The apparatus of claim 1, wherein the collection of scenes includes a set of discrete transmission patterns for the window, wherein the discrete transmission patterns correspond to the scenes.

3. The apparatus of claim 2, wherein the collection include a first pre-programmed scene and a first learned scene, wherein the first scene is the first pre-programmed scene or the first learned scene.

4. The apparatus of claim 1, further comprising the window including the switchable devices coupled to the control device, wherein the switchable devices affect transmission of light through the window.

5. The apparatus of claim 1, wherein the control device includes a remote portion that is located remotely to a controlled space associated with the window and a local portion that is located within the controlled space.

6. The apparatus of claim 1, wherein the state information includes a contrast level between relatively bright and relatively dark objects within a field of view where an occupant is normally situated within a controlled space, whether an orb of the sun is in the field of view where the occupant is normally situated within the controlled space, whether a reflection of the sun is in the field of view where the occupant is normally situated within the controlled space, or an elapsed time since a scene has been changed.

7. The apparatus of claim 1, wherein the state information includes a light intensity, a physical configuration of a controlled space, a sun position, a time of day, a calendar day, or a level of cloudiness.

8. The apparatus of claim 1, wherein the state information includes an occupancy of a controlled space corresponding to the window, a temperature, heat load within the controlled space, or an operating mode of a heating or cooling system.

9. The apparatus of claim 1, wherein the window has a sufficient number of the switchable devices to provide an image or information.

10. The apparatus of claim 1, wherein the switchable devices include electrochromic devices.

11. An apparatus comprising:
a control device configured to select a first scene from a collection of scenes for a window including electrochromic devices in response to receiving a first input corresponding to state information, the electrochromic devices comprise a first electrochromic device having a first edge, a second electrochromic device having a second edge, and a third electrochromic device having a third edge and a fourth edge;
the first edge of the first electrochromic device is immediately adjacent to the third edge of the third electrochromic device, and the second edge of the second electrochromic device is immediately adjacent to the fourth edge of the third electrochromic device; and
for the first scene, where comparing transmission levels of the first, second, and third electrochromic devices, the first electrochromic device has a lowest transmission level, the second electrochromic device has an intermediate transmission level, and the third electrochromic device has a highest transmission level.

12. A method of operating an apparatus comprising:
receiving a first input corresponding to state information; and
at a control device, in response to receiving the first input, selecting a first scene from a collection of scenes for a window including switchable devices
sending a signal to a first electrochromic device, a second electrochromic device, and a third electrochromic device to maintain the first electrochromic device at a first transmission level, to maintain the second electrochromic device at a second transmission level, and to maintain the third electrochromic device at a third transmission level.

13. The method of claim 12, further comprising validating the first scene before selecting the first scene.

14. The method of claim 13, wherein a collection of scenes, including the first scene, includes a set of discrete transmission patterns for the window.

15. The method of claim 14, wherein the collection include a first pre-programmed scene and a first learned scene, wherein the first scene is the first pre-programmed scene or the first learned scene.

16. The method of claim 12, further comprising adding a first learned scene to the collection of scenes.

17. The method of claim 16, further comprising deleting the first learned scene from the collection of scenes.

18. The method of claim 17, further comprising changing a physical configuration within the controlled space.

19. The method of claim 18, further comprising adding a second learned scene to the collection of scenes, wherein the second learned scene is different from the first learned scene.

20. The method of claim 19, wherein adding the second learned scene is performed after changing the physical configuration within a controlled space and deleting the first learned scene.

* * * * *